(12) United States Patent
Okamoto et al.

(10) Patent No.: US 6,455,163 B1
(45) Date of Patent: Sep. 24, 2002

(54) TRANSPARENT OPTICAL ARTICLE

(75) Inventors: Masahiko Okamoto; Koichiro Oka, both of Higashi-Osaka (JP)

(73) Assignee: Yamamoto Kogaku Co., Ltd., Osaka (JP)

( * ) Notice: Subject to any disclaimer, the term of this patent is extended or adjusted under 35 U.S.C. 154(b) by 0 days.

(21) Appl. No.: 09/926,827

(22) PCT Filed: Apr. 23, 2001

(86) PCT No.: PCT/JP01/03477

§ 371 (c)(1),
(2), (4) Date: Dec. 27, 2001

(87) PCT Pub. No.: WO01/84217

PCT Pub. Date: Nov. 8, 2001

(30) Foreign Application Priority Data

May 2, 2000 (JP) ........................................ 2000-133845

(51) Int. Cl.[7] .............................................. B32B 27/36
(52) U.S. Cl. ........................................................ 428/412
(58) Field of Search .......................................... 428/412

(56) References Cited

U.S. PATENT DOCUMENTS 5,827,614 A 10/1998 Bhalakia et al.
5,926,310 A 7/1999 Tamura et al.

FOREIGN PATENT DOCUMENTS

| JP | 63-21605 | 1/1988 |
|---|---|---|
| JP | 1-20228 | 1/1989 |
| JP | 1-43559 | 2/1989 |
| JP | 1-200201 | 8/1989 |
| JP | 1-200202 | 8/1989 |
| JP | 9-258009 | 10/1997 |
| JP | 10-133016 | 5/1998 |

*Primary Examiner*—Terressa M. Boykin
(74) *Attorney, Agent, or Firm*—Oblon, Spivak, McClelland, Maier & Neustadt, P.C.

(57) ABSTRACT

The invention has an object to obtain a polarizing and dimming transparent optical product having both-a polarizing function and a dimming function, for example, polarizing and dimming sunglasses, goggles and lenses. The transparent optical product according to the invention has a lamination structure including one polarizer sheet layer, and at least one layer other than the polarizer sheet having the dimming function. Moreover, a plurality of sheets including one polarizer sheet and at least one sheet other than the polarizer sheet are mutually bonded with an adhesive or a binder to constitute a composite sheet, and at least one of the non-polarizer sheets and adhesive or binder layers in the composite sheet has the dimming function.

14 Claims, No Drawings

TRANSPARENT OPTICAL ARTICLE

TECHNICAL FIELD

The present invention relates to a transparent optical product to be used for sunglasses, goggles or lenses.

BACKGROUND ART

Assuming an oscillation component of light in a plane including directions of an incident light and a normal as a p polarization and an oscillation component of light in a plane perpendicular thereto as an s polarization, light reflected by a glossy surface such as glass or water surface has a minimum point where the s polarization is monotonously increased with respect to an angle of reflection and the p component is almost zero in the vicinity of 60 degrees. By using a polarizing filter for cutting the s polarization and transmitting only the p polarization, accordingly, it is possible to considerably reduce a dazzling feeling caused by the reflected light. There have been known sunglasses, ski goggles and corrective lenses which have a polarizer in order to relieve a dazzlement caused by the reflected light of the surface of the water, a snowy surface, a road, a windowpane or a metallic surface and to give easiness to see by using the principle.

Moreover, there have been known transparent optical products having a dimming and shielding function formed by kneading a dimming dye (a photochromic dye) into a lens base material or coating the surfaces of lenses with a coating agent containing the dyes, which provide sunglasses, ski goggles or corrective lenses with a dimming function and a shielding function by carrying out coloring under external light including a large number of ultraviolet rays and uncoloring under artificial rays having a small number of ultraviolet rays.

However, there has not conventionally been a practical transparent optical product having a high functionality which has both a polarizing function and a dimming function, prevents a dazzlement from being caused by reflected light and properly changes a light shielding property corresponding to the intensity of external light. A technique for inexpensively providing such a transparent optical product having a high functionality has been desired.

In consideration of the problems described above, the invention can inexpensively provide a transparent optical product having a high functionality which comprises both a polarizing function and a dimming function, prevents a dazzlement from being caused by reflected light and properly changes a light shielding property corresponding to the intensity of external light.

DISCLOSURE OF THE INVENTION

Technical aspect according to the invention to solve the technological problems described above is a transparent optical product having a lamination structure including one polarizer sheet, wherein at least one of layers other than the polarizer sheet has a dimming function.

Another technical aspect according to the invention is that a plurality of sheets comprising one layer polarizer sheet and at least one layer other than the polarizer sheets are mutually bonded with an adhesive or a binder to constitute a composite sheet and at least one of the non-polarizer sheets, adhesive layer or binder layer in the composite sheet has a dimming function.

Yet another technical aspect according to the invention is that three or more layers, one inner layer being a polarizer sheet and the rest not being polarizer sheets, are mutually bonded with an adhesive or a binder to constitute a composite sheet and at least one of the non-polarizer sheets, adhesive layer or binder layer in the composite sheet has a dimming function.

Further technical means according to the invention is that both outermost sheets of the composite sheet are formed of resins of the same structure.

Further technical aspect according to the invention is a transparent optical product having a composite sheet and a resin layer laminated, wherein a plurality of sheets including one polarizer sheet layer and at least one non-polarizer sheet layer are mutually bonded with an adhesive or a binder to constitute the composite sheet, one of outermost layers of the composite sheet and the resin layer are integrated by a thermal molding method, and at least one of the non-polarizer sheets, adhesive or binder layer and the resin layer has a dimming function.

Further technical aspect according to the invention is a transparent optical product having a composite sheet and a resin layer laminated, wherein three or more layers, one inner layer being a polarizer sheet and the rest not being polarizer sheets, are mutually bonded with an adhesive or a binder to constitute the composite sheet, one of outermost layers of the composite sheet and the resin layer are integrated by a thermal molding method, and at least one of the non-polarizer sheet layers, adhesive or binder layers and the resin layer has a dimming function.

Further technical aspect according to the invention is that both of the outermost sheets of the composite sheet are formed of resins of the same structure.

Further technical aspect according to the invention is that one of the outermost sheets of the composite sheet and the resin layer are integrated by an injection compression molding method for the resin layer.

Further technical aspect according to the invention is that at least one of the outermost sheets of the composite sheet is formed of a polycarbonate based resin.

Further technical aspect according to the invention is that the polycarbonate based resin has a mean polymerization degree of 100 or less.

Further technical aspect according to the invention is that one of the outermost sheets of the composite sheet and the resin layer are formed of a polycarbonate based resin.

Further technical aspect according to the invention is that the polycarbonate based resin has a mean polymerization degree of 120 or less.

Further technical aspect according to the invention is that at least one of the outermost layers of the composite sheet is formed of a resin having a modulus of photoelasticity of $30 \times 10^{-13}$ $cm^2$/dyne or less and a glass transition temperature of 85° C. or more.

Further technical aspect according to the invention is that one of the outermost sheets of the composite sheet and the resin layer are formed of a resin having a modulus of photoelasticity of $30 \times 10^{-13}$ $cm^2$/dyne or less and a glass transition temperature of 85° C. or more.

Further technical aspect according to the invention is that a thickness x of the composite sheet and a thickness y of the resin layer have a relationship of $100 \geq y/x \geq 0.3$ in every portion within a range of a 35 mm radius from the center of the transparent optical product.

Further technical aspect according to the invention is that an inside surface or surface portion of at least one of the outermost layers of the transparent optical product is processed to provide a dimming function.

BEST MODE OF CARRYING OUT THE INVENTION

The layer structure of a transparent optical product according to the invention will be described. The transparent optical product according to the invention is constituted in a multilayer structure including one polarizer sheet layer, and at least one sheet layer other than the polarizer sheet has a dimming function.

A specific embodiment according to the invention comprises one polarizer sheet layer and at least one non-polarizer sheet layer which are mutually bonded with an adhesive or a binder to constitute a composite sheet (hereinafter referred to as a "composite sheet A" for convenience), and at least one of the non-polarizer sheet layers and adhesive or binder layers has the dimming function.

Specifically, the composite sheet A is constituted by mutually bonding one polarizer sheet layer and one non-polarizer sheet layer with an adhesive or a binder, and at least one of the non-polarizer sheet layer and adhesive or binder layer has the dimming function.

More specifically, the composite sheet A comprises three sheets, central layer being a polarizer sheet, mutually bonded with an adhesive or a binder, and at least one of the non-polarizer sheet layers and adhesive or binder layers has the dimming function. Such a case is one of the most recommended embodiments according to the invention in that the effects of the invention can be sufficiently embodied inexpensively. In particular, where both of two other sheet layers provided as outermost layers are formed of a resin having the same structure, no curl is generated because symmetry in the sectional direction of the composite sheet A can be taken easily, so that the composite sheet A having an excellent plane property can be obtained easily. Moreover, if sheets having different mechanical or optical performances are combined, the performance of the transparent optical product can be enhanced.

More specifically, the composite sheet A comprises four or more layers as a whole, one inner layer is a polarizer sheet, the rest three or more layers of non-polarizer sheets which interpose at least the polarizer sheet and are mutually bonded with an adhesive or a binder, and at least one of the non-polarizer sheet layers and adhesive or binder layers has the dimming function. In this case, all non-polarizer sheets may be resin sheets of the same structure. Alternatively, the performance of the transparent optical product can be enhanced by using sheets having different mechanical or optical performances as some of the sheets.

These transparent optical products usually have planar structures at an adhering or binding stage and are formed into curved structures having spherical surfaces, curved surfaces or the like for processing them into finished products.

Another embodiment according to the invention is a transparent optical product comprising a composite sheet (hereinafter referred to as a "composite sheet B" for convenience) including one polarizer sheet layer and at least one non-polarizer sheet layer which are mutually bonded with an adhesive or a binder, and a resin layer, wherein one outermost layer of the composite sheet B and the resin layer are integrated by a thermal molding method, and at least one of the non-polarizer sheet layer, adhesive or binder layer, and the resin layer has a dimming function.

More specifically, the transparent optical product may comprise the composite sheet B including three sheets, a central layer being a polarizer sheet mutually bonded with an adhesive or a binder, and a resin layer, wherein one of outermost layers of the composite sheet B and the resin layer are integrated by the thermal molding method, and at least one of the non-polarizer sheet layers, adhesive or binder layers, and the resin layer has the dimming function. Such a case is one of the most recommended embodiments according to the invention in that the effects according to the invention can be sufficiently embodied inexpensively. In particular, where both of two non-polarizer sheets provided as the outermost layers of the composite sheet B are formed of a resin having the same structure, no curl is generated because symmetry in the sectional direction of the composite sheet B can be taken easily, so that the composite sheet B having an excellent plane property can be obtained easily, which is advantageous to a workability in an after-processing. Moreover, it is also possible to combine sheets having different mechanical or optical performances.

More specifically, the transparent optical product may comprise the composite sheet B including four or more layers as a whole, one inner layer being a polarizer sheet and the rest three or more layers being non-polarizer sheets and interposing at least the polarizer sheet which are mutually bonded with an adhesive or a binder, and a resin layer, wherein one of the outermost layers of the composite sheet B and the resin layer are integrated by the thermal molding method, and at least one of the other sheet layers, adhesive or binder layers, and the resin layer has the dimming function. In this case, all the non-polarizer sheets of the composite sheet may be formed of a resin of the same structure, or sheets having different mechanical or optical performances may be used as some of the sheets.

These transparent optical products usually have planar structures at an adhering or binding stage for preparing the composite sheet B, and are formed into curved structures having spherical surfaces, curved surfaces or the like at an integration stage with the resin layer or at an earlier stage, and further, shaped into lenses together with the resin layer.

Description will be given to each layer in the layer structure described above in relation to the transparent optical product according to the invention and a method of preparing the same.

It is preferable that the polarizer sheet to be used in the invention is a uniaxially oriented resin sheet in consideration of a bending property and a molding property. Usually, the polarizer sheet is a uniaxially oriented sheet of polyvinyl alcohol, polyvinyl formal, polyvinyl acetal, polyvinyl butylal, or the like or denatured substances thereof, which usually has a uniform film thickness of 1 mm or less.

While the polarizer sheet itself has a constant polarizing performance, since a polarization degree of 80% or more is practically desirable, iodine or a dichromatic dye is doped. The polarizer sheet to be used for the invention can be prepared for use by either of an iodine doping method and a dye doping method.

In the iodine doping method using iodine, specific coloring is less given to the polarizer sheet and a polarization degree is higher as compared with the dye doping method using a dye. On the contrary, there is a drawback that a thermal resistance is low.

On the other hand, the dye doping method provides a higher thermal resistance. Where the polarizer sheet and other sheets are bonded with an adhesive or a binder to prepare a composite sheet, and further heated to prepare a polarizing optical product, or where the composite sheet is provided in a thermoplastic resin or a thermosetting resin or on a surface layer thereof to prepare a polarizing optical product, higher workability can be obtained since a processing temperature range can be further increased during pressing or insert molding as compared with the polarizer sheet prepared by the iodine doping method. On the other hand, the dye doping method has a problem in that a hue peculiar to a dye generally appears on the polarizer sheet. In particular, a light transmittance rate in a greater wavelength than 650 nm is higher than that in the other visible light wavelength region, that is, a view through the polarizer sheet tends to look reddish.

For this reason, in the case in which the polarizer sheet prepared by the dye doping method is to be used, it is preferred that the hue peculiarly caused by coloring with a doping agent for a polarizer is corrected and should be changed to be substantially grayish. For this purpose, a pigment or a dye for correcting the hue peculiar to the polarizer sheet may be blended in at least one of the polarizer sheet layer, the other sheet layers, adhesive or binder layers, and the resin layer which constitute the transparent optical product according to the invention. The "substantially grayish" implies a hue with which an object is viewed without color change through the optical product.

Next, the non-polarizer sheet to be used in the invention will be described. The non-polarizer sheet mainly serves to add a practical function, for example, to protect the polarizer sheet, to provide a strength or retention of shape of a transparent optical product, or to provide an optical function such as a dimming function. It is preferable that the non-polarizer sheet should be a resin sheet having a high transparency, a great workability for pressurizing and heating, and an excellent bonding property to the polarizer sheet. While a thickness is not particularly restricted, it is usually 10 mm or less. In consideration of the workability and the productivity of the sheet itself, generally, the thickness is approximately several $\mu$m to 5 mm.

As the resin to be used for the non-polarizer sheet according to the invention, examples of a thermoplastic resin include a polycarbonate based resin, a polystyrene based resin, an acryl based resin containing a monopolymer and a copolymer of such as methylmethacrylate or a cyclohexylmethacrylate, a vinyl chloride based resin, a polystyrene - methylmethacrylate based resin, an acrylonitrile - styrene based resin, poly-4-methylpentene-1, a principal chain hydrocarbon based resin having an adamantine ring or a cyclopentane ring as a principal chain, a polyester based resin having a fluorene group as a side chain, a polyamide based resin such as clear nylon, a polyurethane based resin, an acyl cellulose based cellulose resin such as acetyl cellulose or propyl cellulose.

In particular, the thermoplastic resin to be used suitably in the invention is the polycarbonate based resin because of a high transparency, a high tenacity, a high thermal resistance and a high refractive index. A typical polycarbonate based resin is polybisphenol A carbonate. In addition, examples of the polycarbonate based resin include homopolycarbonate such as 1,1'-dihydroxydiphenyl-phenylmethylmethane, 1,1'-dihydroxydiphenyl-diphenylmethane, 1,1'-dihydroxy-3,3'-dimethyldiphenyl-2,2-propane, their mutual copolymer polycarbonate and copolymer polycarbonate with bisphenol A.

In general, the polycarbonate based resin has a drawback that a double refraction is increased easily. In other words, an optical anisotropy is easily caused by a molding strain or a local orientation in a molded body. For this reason, in the case in which the polycarbonate based resin is to be used for the invention, it is important that the formation of the optical anisotropy should be prevented as much as possible. As a countermeasure, it is preferable to use a resin which has a high fluidity, an unsusceptibleness to excessive shearing force during molding, that is, a residual strain or a local orientation are unlikely to occur, and a relatively low polymerization degree. In the invention, particularly, the use of a polycarbonate based resin having a polymerization degree of 120 or less, more preferably, 100 or less is recommended.

In order to prevent the optical anisotropy, moreover, a resin having a modulus of photoelasticity of 30×10-3 cm$^2$/dyne or less, preferably, 20×10$^{-13}$ cm$^2$/dyne or less and a glass transition temperature of 85° C. or more, preferably, 90° C. or more is recommended in addition to the polycarbonate based resin in the invention. If the modulus of photoelasticity is more than 30×10$^{-13}$ cm$^2$/dyne, the optical anisotropy is remarkably caused by the residual strain or local orientation of the sheet thus obtained. Moreover, if the glass transition temperature is less than 85° C., there is a problem in that the practical property of the transparent optical product such as sunglasses, goggles or corrective lenses is deteriorated, and furthermore, deformation is easily caused in a higher order processing requiring heating such as a hard coat or an antireflection treatment.

As the thermoplastic resin to satisfy the modulus of photoelasticity and the glass transition temperature, a polymethylmethacrylate resin, a clear nylon resin, "Arton" produced by JSR Co., Ltd. having an adamantine ring or a cyclopentane ring as a principal chain, a resin having hydrocarbon as a principal chain, for example, "Zeonex" produced by Nippon Zeon Co., Ltd. and "Apel" produced by MITSUI CHEMICALS, INC., a polyester based resin having a fluorene group as a side chain, for example, "Optoletz" produced by Hitachi Chemical Co., Ltd., an acetyl cellulose resin and a propyl cellulose resin are particularly recommended. These resins are prepared in a sheet form by an extrusion molding method or a cast molding method.

Since a composite sheet is usually processed or deformed into a curved structure having a spherical surface, a curved surface, or the like, it is preferable that the composite sheet has a pressurizing or heating deformation property to some extent. It is particularly preferable that the non-polarizer sheet is formed of a thermoplastic resin. However, a thermosetting resin may be used for the sheet, if the resin has a low degree of crosslinking and a plastic deforming property so as to be processed into a curved structure having a spherical surface or a curved surface.

Examples of the thermosetting resin which can be used in the invention include a polyfunctional allyl based resin such as diethyleneglycolallyl carbonate (CR39) or diallylphthalate, a polyfunctional acryl based resin, a polyfunctional polyurethane based resin and a polyfunctional polythiourethane based resin, and it is preferable that all of them have a crosslinking state relieved by a copolymerization component.

Next, description will be given to a method of preparing the composite sheet A or the composite sheet B according to the invention. In any of the composite sheets, an adhesive or a binder is used for bonding a polarizer sheet to other sheets. Both of the adhesive and the binder are required to have durability for a long period of time against water, heat, light and deformation, and are not particularly restricted if they basically meet the conditions.

Examples of the adhesive include an isocyanate based adhesive, a polyurethane based adhesive, a polythiourethane based adhesive, an epoxy based adhesive, a vinyl acetate based adhesive, an acryl based adhesive and a wax based adhesive. Examples of the binder include a vinyl acetate based binder and an acryl based binder.

The adhesives and binders are uniformly applied onto a polarizer sheet or other sheets by an ordinary applying method such as a gravure coating method or an offset coating method. The thickness of the adhesive or binder is usually 1 to 100 $\mu$m.

In some cases, the surfaces of the polarizer sheet or other sheets are subjected to a chemical solution treatment using acid or alkali, an ultraviolet treatment, or a plasma or corona discharge treatment in bonding or binding process in order to enhance bonding to a base material.

Moreover, the composite sheet A or the composite sheet B can be prepared by mutually superposing sheets to which an adhesive or a binder is applied previously or immediately before sticking directly from a roll or in a cutting state.

Next, the resin layer to be used in the invention will be described. The resin layer mainly serves to give a practical function such as protecting the composite sheet B or providing strength, thermal resistance, figure retention or a lens power of the transparent optical product.

A resin to be used for an outermost layer of the composite sheet B and a resin to be used for a resin layer may be any resins so far as they can be mutually integrated by a heat molding method, and it is generally preferable that they are formed of resins of the same structure. They may generally have a slight variation in a copolymerization component, a polymerization degree, a viscosity and an additive each other.

The heat molding method indicates a thermal molding method such as a compression molding method, a transfer molding method or an injection molding method, and an insert injection molding method disclosed in Japanese Patent Application No. Hei 10-49707 is basically preferable in respect of a productivity and precision in the shape of a product. More specifically, the composite sheet B is set in a metal mold so that the outermost layer thereof, which can be mutually integrated with the resin of the resin layer, is faced to the molding chamber side in the mold, and then the resin is injected to mold the resin layer.

In particular, an injection compression molding method of an insert type is preferable for the use in which the precision in a shape is particularly required, for example, sunglasses, goggles or corrective lenses. Since a resin is injected into a metal mold at a low pressure and the metal mold is then closed at a high pressure to apply compression force to the resin in the injection compression molding method, an optical anisotropy due to the molding strain of a molded body or a local orientation during molding is unlikely to be caused. By controlling metal mold compression force to be uniformly applied to the resin, moreover, the resin can be cooled at a constant specific volume. Consequently, a molded product having high dimensional precision can be obtained. In particular, this method can be preferably applied to a polycarbonate based resin having a high double refraction.

The resin layer is heated and molded to have a uniform thickness on the composite sheet B, that is, to form a plano lens or a semifinished lens, or to form a lens having minus or plus power.

If the thickness of the composite sheet B of the invention is represented by x and the thickness of the resin layer is represented by y, x is usually approximately 0.1 mm to 2 mm in all regions of the transparent optical product according to the invention so that the composite sheet can have a uniform thickness. On the other hand, y may have a uniform thickness or the thickness continuously varied from a central part toward the periphery as in a case of a minus power lens or a plus power lens. Referring to a range within a 35 mm radius from the center of the transparent optical product, y can usually be set to approximately 0.5 mm to 20 mm in any place according to the invention.

It is preferable that x and y have a relationship of $100 \geq y/x \geq 0.3$, particularly, $80 \geq y/x \geq 0.5$ in every part of the transparent optical product according to the invention. If y/x is more than 100, y is increased too much so that the weight of the transparent optical product increases or the precise molding property of the resin layer is deteriorated in some cases. Alternatively, when x is reduced too much, the composite sheet B is improperly prepared in some cases. Moreover, if y/x is less than 0.3, x is increased too much so that preparation of the composite sheet B is difficult or a workability thereof is deteriorated.

Next, description will be given to a dimming function which at least one layer other than the polarizer sheet according to the invention provides. The dimming function is given by using a dimming dye.

The type of the dimming dye to be used in the invention is not particularly restricted but may include a spiropyrane based dye, a naphthopyrane based dye, a furan based dye, a Spiro oxazine based dye, a fulgide based dye and a chromene based dye which are generally used. It is preferable that the dimming dye has a high coloring concentration against ultraviolet rays, a high coloring speed, a hue which is as colorless as possible after the removal of the ultraviolet rays, a high achromatic speed, and an excellent durability for short and long periods of time under processing conditions, practical conditions and storage conditions such as heat, light or humidity. As a hue obtained after coloring, brown and gray-are generally desirable. Therefore, plural kinds of dimming dyes are usually used at the same time and the ratio and amount of each dye to be used are determined to obtain a favorite hue.

In order to form a transparent optical product in which at least one layer of other than the polarizer sheet has the dimming function, in the invention, a dimming dye is blended into at least one of the non-polarizer sheets constituting a transparent optical product, adhesive or binder layers for bonding the sheets to the polarizer sheet to prepare a composite sheet, and a resin layer by means of an adding method such as a kneading method or an after-processing method such as a dyeing method or a coating method. In the case in which plural kinds of dimming dyes are used at the same time it is generally easier and more economical to blend all the dimming dyes into one layer rather than blending each dye to each layer separately by a preadding method.

In respect of the easiness of control of the blending amount, generally, the kneading method is often employed. However, since the dimming dye is blended to the non-polarizer sheets or the resin sheet as a pellet or during molding, the dimming dye receives the fusing thermal history of a resin and is therefore degraded thermally in some cases. Moreover, in the case that the thickness y of the resin layer is not uniform, the depth of the hue differs depending on the thickness of the layer, blending of the dimming dye into the resin layer should be carried out carefully.

Also in the kneading method, in the case in which the dimming dye is particularly kneaded into an adhesive or a binder, the blending can be carried out at a low temperature of 100° C. or less and the dimming dye can be prevented from being thermally degraded. Therefore, the kneading method is excellent.

Moreover, a method of chemically or physically dyeing, in which the dimming dye is impregnated or diffused from at least one of surfaces of the transparent optical product to the inside thereof, can also provide the dimming function at a relatively low temperature and can be preferably used for convenience.

Furthermore, a coating method of applying a hard coat or a primer coat containing a dimming dye in a thickness of approximately 1 to 100 $\mu$m onto at least one of the surfaces of the transparent optical product to provide a film having the dimming function is also convenient and can be preferably used.

It is possible to give the dimming dye a polymerization group such as a (metha)acryloiloxy group or a (metha)allyl group. If a copolymerization component having a bonding function or a binding function is used, it can be utilized as an adhesive or a binder having a dimming performance in the invention. Moreover, if a copolymerization component having a function of increasing an adhesion to a base material and a film hardness is used, it is possible to provide at least one of the surfaces of the transparent optical product with a film having the dimming performance by the coating method.

Referring to the structures and arrangements of the composite sheet and the resin layer which constitute the transparent optical product according to the invention, a portion in which a dimming dye is to be blended and a blending method, preferred embodiments according to the invention will be illustrated as follows. (\) indicates a portion in which bonding is carried out through an adhesive layer or a binder layer, = indicates a portion in which the non-polarizer sheets and the resin layer are to be integrated by the heat molding method, a mark * indicates a portion in which the dimming dye is to be blended by the kneading method, a mark  indicates a portion in which the dimming dye is to be given and blended to the inside of the surface by the dyeing, impregnating or diffusing method, and a mark * indicates a portion in which the dimming dye is to be given and blended to the surface through a film in the coating method.

(1) other sheet (\) polarizer sheet (\*) other sheet
(2) other sheet (\) polarizer sheet (\) other sheet *
(3) other sheet (\) polarizer sheet (\) other sheet **
(4) other sheet (\) polarizer sheet (\) other sheet ***
(5) other sheet (\) polarizer sheet (\*) other sheet=resin layer
(6) other sheet (\*) polarizer sheet (\) other sheet=resin layer
(7) other sheet *(\) polarizer sheet (\) other sheet=resin layer
(8) other sheet ** (\) polarizer sheet (\)other sheet=resin layer
(9) other sheet *** (\) polarizer sheet (\) other sheet=resin layer
(10) other sheet (\) polarizer sheet (\) other sheet *=resin layer
(11) other sheet (\) polarizer sheet (\) other sheet=resin layer *
(12) other sheet (\) polarizer sheet (\) other sheet=resin layer **
(13) other sheet (\) polarizer sheet (\) other sheet=resin layer ***

The invention includes the case in which the "other sheet" is one layer sheet and the case in which the "other sheet" is a composite-sheet including a plurality of resin sheets having the same structure which are mutually bonded with an adhesive or a binder or is a composite sheet including a plurality of resin sheets having different structure.

It is preferable that the transparent optical product according to the invention has a surface on at least one of sides which is subjected to a hard coat processing. Examples of the hard coat include a thermosetting type hard coat such as a silane based hard coat or an epoxy based hard coat and an active ray curing type hard coat such as an acryl based hard coat or an epoxy based hard coat which are generally used. Usually, the hard coat is given in a film thickness of approximately 0.5 to 15 $\mu$m.

Moreover, it is preferable that the polarizing optical product according to the invention has a surface on at least one of sides which is subjected to an antireflection processing. In the antireflection processing, usually, approximately two to eight inorganic films having different refractive indices from each other are laminated by vacuum evaporation or approximately one to three organic films are laminated by a wet method in an optical thickness adjacently over the hard coat.

Furthermore, it is preferable that the polarizing optical product according to the invention has a surface on at least one of sides which is subjected to an antifouling processing. In the antifouling processing, a fluorine based organic compound is usually given in a thickness of several tens nm to order of $\mu$m by the vacuum evaporation or the wet method in order to prevent contamination from being caused by an organic substance, for example, the contamination of an antireflection film by fingerprints and to easily wipe up the contamination.

Moreover, it is preferable that the polarizing optical product according to the invention has a surface on at least one of sides which is subjected to an antifogging processing. In the antifogging processing, a hydrophilic resin such as a polyvinyl alcohol based resin or a polyvinyl pyrrolidone based resin is usually given in a thickness of approximately 1 to 50 $\mu$m.

Next, the invention will be specifically described by taking examples but is not restricted thereto.

EXAMPLE 1

One of surfaces of a polyvinyl alcohol based polarizer sheet having a thickness of approximately 20 $\mu$m was coated with a binder ("Saibinol" AT-245 produced by Saiden Chemical Co., Ltd.) containing 10% by weight of a spiro oxazine based dimming dye 1,3,3,5,6-pentamethylspiro [indolino-2,3'[3 H]-naphto(2,1b)(1,4)oxazine based on a solid content in a thickness of 30 $\mu$m.

A polycarbonate sheet having a thickness of 400 $\mu$m prepared by using a polycarbonate resin having a mean polymerization degree of approximately 80 was stuck onto the binder surface.

In the same manner as described above, furthermore, the other surface of the polarizer sheet was coated with a binder which does not contain the dimming dye and the polycarbonate sheet was stuck onto the same portion. A composite sheet thus obtained was subjected to a bonding processing at 40° C. so that a polarizing and dimming transparent optical product having a thickness of 0.88 mm and a visible light transmittance of 50% was obtained.

The transparent optical product was exposed to the direct rays of the sun to cause a color of the dimming dye to come out and a visible light transmittance measured immediately was 20%. When the color of the transparent optical product was caused to disappear under room light, the visible light transmittance was returned to an almost original state.

Moreover, when the transparent optical product and the polarizer sheet were set into crossed Nicols, a remarkable photoelastic phenomenon was not observed with the polarizer sheet put on either side of the transparent optical product.

EXAMPLE 2

One of surfaces of a polyvinyl alcohol based polarizer sheet having a thickness of 20 μm was coated with a binder ("Saibinol" AT-245 produced by Saiden° Chemical Co., Ltd.) containing 10% by weight of a Spiro oxazine based dimming dye 1,3,3,5,6-pentamethylspiro[indolino-2,3'[3H]-naphto(2,lb)(1,4)oxazine based on a solid content in a thickness of 30 μm.

A TAC sheet composite sheet having a thickness of 400μm prepared by bonding two triacetate (TAC) sheets having a thickness of 190 μm was stuck onto the binder surface.

In the same manner as described above, furthermore, the other surface of the polarizer sheet was coated with a binder which does not contain the dimming dye and the TAC sheet composite sheet was stuck onto the same portion. A composite sheet thus obtained was subjected to a bonding processing at 40° C. so that a polarizing and dimming transparent optical product having a thickness of 0.88 mm and a visible light transmittance of 52% was obtained.

The transparent optical product was exposed to the direct rays of the sun to cause a color of the dimming dye to come out and a visible light transmittance measured immediately was 23%. When the color of the transparent optical product was caused to disappear under room light, the visible light transmittance was returned to an almost original state.

Moreover, when the transparent optical product and the polarizer sheet were set into crossed Nicols, a remarkable photoelastic phenomenon was not observed with the polarizer sheet put on either side of the transparent optical product.

EXAMPLE 3

One of surfaces of a polycarbonate sheet having a thickness of 400 μm prepared by blending 1% by weight of the dimming dye utilized in the example 1 into a polycarbonate resin having a mean polymerization degree of approximately 80 was coated with a binder ("Saibinol" AT-245 produced by Saiden Chemical Co., Ltd.) in a thickness of 30 μm. Thus, a dimming dye blended polycarbonate sheet having the binder was prepared.

Furthermore, a polycarbonate sheet having a binder was prepared in the same manner as described above except that the dimming dye was not blended.

The dimming dye blended polycarbonate sheet having the binder was stuck to one of the surfaces of a polyvinyl alcohol based polarizer sheet having a thickness of 20 μm and the polycarbonate sheet having the binder was stuck to the other surface, and a bonding processing was carried out. A composite sheet thus obtained was a polarizing and dimming transparent optical product having a thickness of 0.88 mm and a visible light transmittance of 41%.

The transparent optical product was exposed to the direct rays of the sun to cause a color of the dimming dye to come out and a visible light transmittance measured immediately was 12%. When the color of the transparent optical product was caused to disappear under room light, the visible light transmittance was returned to an almost original state.

Moreover, when the transparent optical product and the polarizer sheet were set into crossed Nicols, a remarkable photoelastic phenomenon was not observed with the polarizer sheet put on either side of the transparent optical product.

EXAMPLE 4

One of surfaces of a sheet having a thickness of 1 mm prepared by using a resin "Arton GI" produced by JSR Co., Ltd. in which a modulus of photoelasticity measured by an ellipsometer method is $4.1 \times 10^{-13}$ cm$^2$/dyne and a glass transition temperature is 170° C. was coated, in a thickness of 30 μm, with a binder ("Saibinol" AT-D40 produced by Saiden Chemical Co., Ltd.) containing 10% by weight of the spiro oxazine based dimming dye used in the example 1 based on a solid content. Thus, a dimming dye blended sheet having the binder was prepared.

In the same manner as described above, an "Arton G" resin sheet having a thickness of 1 mm which does not include the dimming dye but has a binder was prepared.

The "Arton G" resin sheet containing the dimming dye and having the binder was stuck to one of surfaces of a polyvinyl alcohol based polarizer sheet having a thickness of 20 μm and the "Arton G" resin sheet containing no dimming dye and having the binder was stuck to the other surface, and they were subjected to a bonding processing. A composite sheet thus obtained was a polarizing and dimming transparent optical product having a thickness of 2.08 mm and a visible light transmittance of 53%.

The transparent optical product was exposed to the direct rays of the sun to cause a color of the dimming dye to come out and a visible light transmittance measured immediately was 23%. When the color of the transparent optical product was caused to disappear under room light, the visible light transmittance was returned to an almost original state (54%).

Moreover, when the transparent optical product and the polarizer sheet were set into crossed Nicols, a remarkable photoelastic phenomenon was not observed with the polarizer sheet put on either side of the transparent optical product.

EXAMPLE 5

In order to carry out insert molding, the composite sheet prepared in the example 1 was molded into a convex spherical shape equally to the curvature of a concave metal mold. In that case, a polycarbonate sheet containing a dimming dye and having a binder was set to the front surface of a convex body (the convex side of a spherical molded body).

The convex side of the molded body thus obtained was set to the concave metal mold and was sucked onto the molding surface of the concave metal mold through a sucking hole provided on the concave metal mold, thereby forming a molding cavity together with a convex metal mold.

By using a polycarbonate resin having a polymerization degree of approximately 80 as a resin layer, a lens-shaped polarizing and dimming transparent optical product was subjected to the insert molding by an injection compression molding method. The transparent optical product thus obtained is a plano lens in which a composite sheet having a polarizing and dimming function in a thickness (x) of 0.88 mm is provided on the front surface of the lens and a resin layer integrated therewith and having a radius of 35 mm and a thickness (y) of 2 mm is provided in a rear part.

The transparent optical product was exposed to the direct rays of the sun to cause a color of the dimming dye to come out and a visible light transmittance immediately measured in the central part of the lens was 19%. When the color of the transparent optical product was caused to disappear under room light, the visible light transmittance was returned to an almost original state (48%).

Moreover, when the lens and the polarizer sheet were set into crossed Nicols, a remarkable photoelastic phenomenon was not observed with the polarizer sheet put on either side of the lens.

EXAMPLE 6

The composite sheet prepared in the example 4 was molded into a convex spherical shape in which an "Arton G" resin sheet containing a dimming dye and having a binder is provided on a front surface (the convex side of a spherical molded body) equally to the curvature of a concave metal mold. The convex side of the molded body thus obtained was set to the concave metal mold and was sucked onto the molding surface of the concave metal mold through a sucking hole provided on the concave metal mold, thereby forming a molding cavity together with a convex metal mold.

By using the "Arton G" resin as a resin layer, a lens-shaped polarizing and dimming transparent optical product was subjected to insert molding by an injection compression molding method.

The transparent optical product thus obtained is a semi-finished lens in which a composite sheet including a polarizer sheet and having a thickness (x) of 2.08 mm is provided on the front surface of the lens and a resin layer integrated therewith and having a radius of 35 mm and a thickness of approximately 13 mm is provided in a rear part.

The rear side of the lens was polished to fabricate a lens having a minus power in which a center has a thickness of 3 mm (the resin layer has a thickness y of 0.92 mm) and the peripheral part of the lens has a thickness of 5 mm (the resin layer has a thickness y of 2.92 mm).

The transparent optical product was exposed to the direct rays of the sun to cause a color of the dimming dye to come out and a visible light transmittance immediately measured in the central part of the lens was 22%. When the color of the transparent optical product was caused to disappear under room light, the visible light transmittance was returned to an almost original state (53%).

Moreover, when the lens and the polarizer sheet were set into crossed Nicols, a remarkable photoelastic phenomenon was not observed with the polarizer sheet put on either side of the lens.

COMPARATIVE EXAMPLE 1

A polarizing and dimming transparent optical product was prepared in the same manner as in the example 1 except that a polycarbonate resin had a mean polymerization degree of approximately 120.

When the transparent optical product and the polarizer sheet were set into crossed Nicols, a remarkable photoelastic phenomenon was observed with the polarizer sheet put on either side of the transparent optical product.

According to the invention, it is possible to provide an inexpensive polarizing and dimming transparent optical product having a polarizing function and a dimming function, for example, polarizing and dimming sunglasses, goggles and lenses.

INDUSTRIAL APPLICABILITY

The invention is useful for a transparent optical product, particularly, a chair form transparent optical product such as sunglasses, goggles or lenses.

What is claimed is:

1. A transparent optical product having a composite sheet and a resin layer laminated to each other, the composite sheet comprising one polarizer sheet layer and at least one other sheet layer which are mutually bonded with an adhesive or a binder, one of outermost layers of the composite sheet being integrated with the resin layer by a thermal molding method, at least one of the other sheet layer, adhesive or binder layer, and the resin layer having a dimming function.

2. A transparent optical product having a composite sheet and a resin layer laminated to each other, the composite sheet comprising three or more layers including one inner layer of a polarizer sheet and the other layers of non-polarizer sheets which are mutually bonded with an adhesive or a binder, one of outermost layers of the composite sheet being integrated with the resin layer by a thermal molding method, at least one of the other sheet layers, adhesive or binder layers, and resin layer having a dimming function.

3. The transparent optical product according to claim 1, wherein both of the outermost layers of the composite sheet are formed of resins of the same structure.

4. The transparent optical product according to claim 1, wherein one of the outermost layers of the composite sheet is integrated with the resin layer by an injection compression molding-method for the resin layer.

5. The transparent optical product according to claim 1, wherein one of the outermost layers of the composite sheet and the resin layer are formed of a polycarbonate based resin.

6. The transparent optical product according to claim 5, wherein the polycarbonate based resin has a mean polymerization degree of 120 or less.

7. The transparent optical product according to claim 1, wherein one of the outermost layers of the composite sheet and the resin layer are formed of a resin having a modulus of photoelasticity of $30 \times 10^{-13}$ cm$^2$/dyne or less and a glass transition temperature of 85° C. or more.

8. The transparent optical product according to claim 1, wherein a thickness x of the composite sheet and a thickness y of the resin layer have a relationship of $100 \geq y/x \geq 0.3$ in every portion within a range of a 35 mm radius from the center of the transparent optical product.

9. The transparent optical product according to claim 2, wherein both of the outermost layers of the composite sheet are formed of resins of the same structure.

10. The transparent optical product according to claim 2, wherein one of the outermost layers of the composite sheet is integrated with the resin layer by an injection compression molding method for the resin layer.

11. The transparent optical product according to claim 2, wherein one of the outermost layers of the composite sheet and the resin layer are formed of a polycarbonate based resin.

12. The transparent optical product according to claim 6, wherein the polycarbonate based resin has a mean polymerization degree of 120 or less.

13. The transparent optical product according to claim 2, wherein one of the outermost layers of the composite sheet and the resin layer are formed of a resin having a modulus of photoelasticity of $30 \times 10^{-13}$ cm$^2$/dyne or less and a glass transition temperature of 85° C. or more.

14. The transparent optical product according to claim 2, wherein a thickness x of the composite sheet and a thickness y of the resin layer have a relationship of $100 \geq y/x \geq 0.3$ in every portion within a range of a 35 mm radius from the center of the transparent optical product.

* * * * *